US012592552B2

(12) United States Patent
Shin et al.

(10) Patent No.: US 12,592,552 B2
(45) Date of Patent: Mar. 31, 2026

(54) CENTRAL TENSION LINE FOR OVERHEAD POWER TRANSMISSION CABLE HAVING DAMAGE DETECTION FUNCTION AND OVERHEAD POWER TRANSMISSION CABLE COMPRISING SAME

(71) Applicant: LS CABLE & SYSTEM LTD., Anyang-si (KR)

(72) Inventors: Seung Hyun Shin, Suwon-si (KR); Min Seok Kwon, Songpa-gu (KR); Seung Hwan Eun, Dongjak-gu (KR); Jee Yong Park, Anyang-si (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 238 days.

(21) Appl. No.: 18/565,455

(22) PCT Filed: May 27, 2022

(86) PCT No.: PCT/KR2022/007549
§ 371 (c)(1),
(2) Date: Nov. 29, 2023

(87) PCT Pub. No.: WO2022/255735
PCT Pub. Date: Dec. 8, 2022

(65) Prior Publication Data
US 2024/0266816 A1 Aug. 8, 2024

(30) Foreign Application Priority Data
May 31, 2021 (KR) ........................ 10-2021-0069925
May 26, 2022 (KR) ........................ 10-2022-0064430

(51) Int. Cl.
*H02G 7/02* (2006.01)
*G02B 6/02* (2006.01)
(Continued)

(52) U.S. Cl.
CPC ........... *H02G 7/02* (2013.01); *G02B 6/02033* (2013.01); *H01B 1/023* (2013.01); *H01B 5/102* (2013.01)

(58) Field of Classification Search
None
See application file for complete search history.

(56) References Cited

U.S. PATENT DOCUMENTS 8,658,902 B2 * 2/2014 Kim ...................... B82Y 30/00
174/126.1
2004/0124001 A1 7/2004 Sanders
2024/0420870 A1 * 12/2024 Shin ...................... H01B 7/205

FOREIGN PATENT DOCUMENTS

CN 108922664 A * 11/2018 ............. H01B 11/00
DE 8304203 U1 8/1984
(Continued)

OTHER PUBLICATIONS

International Search Report for related International Application No. PCT/KR2022/007549; action dated Dec. 8, 2022; (2 pages).
(Continued)

*Primary Examiner* — Krystal Robinson
(74) *Attorney, Agent, or Firm* — K&L Gates LLP

(57) ABSTRACT

The present disclosure relates to a central tension line for an overhead power transmission cable having a damage detection function and an overhead power transmission cable comprising same, wherein it is possible to detect whether the central tension line is damaged before installing the overhead transmission cable on a pylon or before clamping for the installation of the overhead transmission cable, and after installing the overhead transmission cable on the pylon; and the central tension line has excellent tensile strength, thus having excellent sag properties preventing the wired overhead transmission cable from sagging, and has flexibility, thus improving wiring workability, while the central tension (Continued)

line suppresses corrosion and damage to a conductor wire disposed around the central tension line, and thus eliminates or minimizes an increase in resistance of the overhead transmission cable and the resultant reduction in transmission capacity, and enables the reduction of weight and manufacturing costs.

18 Claims, 11 Drawing Sheets

(51) Int. Cl.
*H01B 1/02* (2006.01)
*H01B 5/10* (2006.01)

(56) References Cited

FOREIGN PATENT DOCUMENTS

| DE | 4212147 | A1 | 10/1993 |
|----|---------|----|---------|
| KR | 1020010038689 | A | 5/2001 |
| KR | 1020010059912 | A | 7/2001 |
| KR | 1020010088554 | A | 9/2001 |
| KR | 1020180092067 | A | 8/2018 |
| KR | 1020190119392 | A | 10/2019 |

OTHER PUBLICATIONS

Written Opinion for related International Application No. PCT/KR2022/007549; action dated Dec. 8, 2022; (4 pages).
Extended European Search Report for related European Application No. 22816394.5; action dated Mar. 25, 2025; (8 pages).

* cited by examiner (a)

(b)

CENTRAL TENSION LINE FOR OVERHEAD POWER TRANSMISSION CABLE HAVING DAMAGE DETECTION FUNCTION AND OVERHEAD POWER TRANSMISSION CABLE COMPRISING SAME

CROSS-REFERENCE TO RELATED APPLICATIONS

The present application is a National Stage of International Application No. PCT/KR2022/007549 filed on May 27, 2022, which claims the benefit of Korean Patent Application No. 10-2021-0069925, filed on May 31, 2021, and Korean Patent Application No. 10-2022-0064430, filed on May 26, 2022 with the Korean Intellectual Property Office, the entire contents of which are hereby incorporated by reference.

FIELD

The present disclosure relates to a central tension line for overhead power transmission cables having a damage detection function and an overhead power transmission cable comprising the same. More particularly, the present disclosure relates to a central tension line for overhead power transmission cables and an overhead power transmission cable comprising the same, which may easily and accurately detect whether or not the central tension line is damaged after installing the overhead power transmission cable on a pylon as well as just before installing the overhead power transmission cable on the pylon or just before a clamping operation for installation of the overhead power transmission cable, may not only have excellent sag properties due to excellent tensile strength of the central tension line so as to prevent the wired overhead power transmission cable from sagging but also improve wiring workability due to sufficient flexibility of the central tension line, may suppress corrosion and damage to conductor wires disposed around the central tension line so as to avoid or minimize increase in the resistance of the overhead power transmission cable and reduction in a transmission capacity thereby, and may achieve reduction in the weight and manufacturing costs of the overhead power transmission cable.

BACKGROUND

There are an overhead power transmission method using overhead power transmission cables connected to pylons and an underground power transmission method using underground power transmission cables buried underground as methods of supplying electricity to cities or factories from a power station through a substation, and the overhead power transmission method occupies about 90% of domestic power transmission.

An Aluminum Conductor Steel Reinforced (ACSR) overhead power transmission cable in which several strands of an aluminum alloy conductor are disposed at the outer circumference of a central tension line configured to achieve high tensile strength is generally used as a conventional overhead power transmission cable.

However, the aluminum conductor steel reinforced (ACSR) overhead power transmission cable greatly sags due to the high load of a steel core used as the central tension line, and is limited in increasing the weight of the aluminum conductor to increase the transmission capacity of the overhead power transmission cable, and therefore, there are attempts to reduce the weight of an overhead power transmission cable using a fiber reinforced composite material in a central tension line so as to reduce sagging of the overhead power transmission cable or to increase the transmission capacity at the same sag.

FIG. 1 schematically illustrates the cross-sectional structure of a conventional overhead power transmission cable having a central tension line including a fiber reinforced composite material.

As shown in FIG. 1, the conventional overhead power transmission cable may include a central tension line 10 and conductor wires 20 disposed around the central tension line 10, and the central tension line 10 may include a core layer 11 formed of a carbon fiber reinforced composite material, and a cover layer 12 formed of a glass fiber reinforced composite material so as to inhibit corrosion of the conductor wires 20 due to bimetallic corrosion, i.e., galvanic corrosion, between the core layer 11 and the conductor wires 20.

However, the conventional overhead power transmission cable is limited in weight reduction due to the high specific gravity, which may be for example 2.0 g/cm$^3$, of the glass fiber composite material forming the cover layer 12 of the central tension line 10, and may thus deteriorate less properties, and the conductor wires 20, which are disposed around the central tension line, come into contact with the cover layer 12 and thus cause friction with the cover layer 12, are damaged due to the high hardness of the glass fiber composite material, and may consequently cause increase in resistance and reduction in a transmission capacity owing to reduction in the cross-sectional area of the conductor wires 20. Further, application of the relatively expensive glass fiber reinforced composite material increases the manufacturing costs of the overhead power transmission cable.

Further, in the conventional overhead power transmission cable, whether or not the central tension line 10 disposed in the overhead power transmission cable is damaged may not be confirmed just before installing the overhead power transmission cable because the conductor wires 20 are disposed around the central tension line 10, and technology for inserting optical fibers into the central tension line 10, transmitting light of a specific wavelength band by an optical transmission device mounted at one end of the central tension line 10, and confirming whether or not the transmitted light is detected by an optical detection device mounted at the other end of the central tension line 10 so as to confirm whether or not the optical fibers are damaged and thereby to confirm whether or not the central tension line 10 is damaged is applied.

However, in the case that the optical fibers are inserted into the central tension line 10, it may be difficult to detect whether or not the central tension line is damaged, i.e., there may be a case in which the optical fibers are not damaged even though the central tension line 10 is damaged, or a case in which the optical fibers are damaged even though the central tension line 10 is not damaged.

Further, because whether or not the central tension line 10 is damaged is confirmed by the optical transmission device and the optical detection device mounted at both ends of the central tension line 10, whether or not the central tension line 10 is damaged may be confirmed only before an operation of clamping the overhead power transmission cable, and may not be detected after installing the overhead power transmission cable.

Moreover, when an optical signal transmitted from one end of an optical fiber inserted into the central tension line 10 to the other end of the optical fiber is observed with the naked eye, it is possible to detect whether or not the optical fiber is completely cut off, but it is impossible to detect which portion of the optical fiber or the central tension line is damaged.

Therefore, a central tension line for overhead power transmission cables and an overhead power transmission cable comprising the same, which may easily and accurately detect whether or not the central tension line is damaged or which position of the central tension line is damaged after installing the overhead power transmission cable on a pylon as well as just before installing the overhead power transmission cable on the pylon or just before a clamping operation for installation of the overhead power transmission cable, may not only have excellent sag properties due to excellent tensile strength of the central tension line so as to prevent the wired overhead power transmission cable from sagging but also improve wiring workability due to sufficient flexibility of the central tension line, may suppress corrosion and damage to conductor wires disposed around the central tension line so as to avoid or minimize increase in the resistance of the overhead power transmission cable and reduction in a transmission capacity thereby, and may achieve reduction in the weight and manufacturing costs of the overhead power transmission cable, are desperately required.

SUMMARY

Therefore, the present disclosure has been made in view of the above problems, and it is an object of the present disclosure to provide a central tension line for overhead power transmission cables and an overhead power transmission cable comprising the same, which may easily and accurately detect whether or not the central tension line is damaged or which position of the central tension line is damaged after installing the overhead power transmission cable on a pylon as well as just before installing the overhead power transmission cable on the pylon or just before a clamping operation for installation of the overhead power transmission cable.

Further, it is another object of the present disclosure to provide a central tension line for overhead power transmission cables and an overhead power transmission cable comprising the same, which may not only have excellent sag properties due to excellent tensile strength of the central tension line so as to prevent the wired overhead power transmission cable from sagging but also improve wiring workability due to sufficient flexibility of the central tension line.

Further, it is yet another object of the present disclosure to provide a central tension line for overhead power transmission cables and an overhead power transmission cable comprising the same, which may suppress corrosion and damage to conductor wires disposed around the central tension line so as to avoid or minimize increase in the resistance of the overhead power transmission cable and reduction in a transmission capacity thereby.

Moreover, it is a further object of the present disclosure to provide a central tension line for overhead power transmission cables and an overhead power transmission cable comprising the same, which may achieve reduction in the weight and manufacturing costs of the overhead power transmission cable.

In accordance with the present disclosure, the above and other objects can be accomplished by the provision of a central tension line for overhead power transmission cables, comprising; a core layer comprising fiber reinforced plastic comprising reinforcing fibers in a thermosetting resin matrix; and a detection part inserted into the core layer and comprising at least one optical fiber and a protective tube configured to surround the at least one optical fiber, wherein the protective tube comprises an interfacial layer configured such that the reinforcing fibers comprised in the core layer penetrate thereinto, and an inner layer configured such that the reinforcing fibers do not penetrate thereinto.

Further, provided is the central tension line, wherein the interfacial layer is configured such that a polymer resin configured to form the protective tube and the reinforcing fibers are mixed.

Further, provided is the central tension line, wherein a ratio of a length occupied by the interfacial layer to an outer circumference of the protective tube is equal to or greater than 60%, in an arbitrary cross section of the protective tube.

Further, provided is the central tension line, wherein the interfacial layer comprises an area having a thickness of 5 μm or more, in an arbitrary cross section of the protective tube.

Further, provided is the central tension line, wherein an average thickness of the interfacial layer is equal to or greater than 5 μm, in an arbitrary cross section of the protective tube.

Further, provided is the central tension line, wherein a ratio of a cross-sectional area of the detection part to a cross-sectional area of the core layer to 1 to 12%, in an arbitrary cross section of the protective tube.

Further, provided is the central tension line, wherein tensile strength of the central tension line comprising the detection part is equal to or greater than 2,800 MPa.

Further, provided is the central tension line, satisfying Equation 1 below, $$0 \le (b - a) \le (50\% \text{ of Outer Diameter of Core Layer}),$$

wherein:

b indicates a maximum distance out of distances between a surface of the detection part and a surface of the core layer; and a indicates a minimum distance out of the distances between the surface of the detection part and the surface of the core layer.

Further, provided is the central tension line, wherein the protective tube is an insulating tube formed of a polymer resin having tensile strength of 60 MPa or more, elongation of 5% or more, a tensile modulus of 2,000 MPa or more, flexural strength of 90 MPa or more, a flexural modulus of 2,500 MPa or more, a melting point of 100 to 260° C., and a glass transition temperature of 80 to 82° C.

Further, provided is the central tension line, wherein the polymer resin is polyvinyl chloride (PVC) or polybutylene terephthalate (PBT).

Further, provided is the central tension line, wherein the reinforcing fibers comprise carbon fibers, wherein the carbon fibers comprise high-strength continuous fibers having a diameter of 3 to 35 μm, and have tensile strength of 3.5 to 5.0 GPa, an elastic modulus of 140 to 600 GPa, and a coefficient of expansion of 0 μm/m° C. or less.

Further, provided is the central tension line, wherein a total volume ratio of the carbon fibers to a volume of the core layer other than the detection part is 50 to 85%, wherein the total volume ratio of the carbon fibers is defined as below.

Total Volume Ratio (%) of Carbon Fibers =

(Total Volume of Carbon Fibers/Volume of Core Layer other than Detection part)×100

Further, provided is the central tension line, wherein the thermosetting resin matrix comprises a base resin having a glass transition temperature (Tg) of 205° C. or higher.

Further, provided is the central tension line, wherein the base resin comprises an epoxy resin.

Further, provided is the central tension line, wherein the detection part further comprises a gap formed between the protective tube and the at least one optical fiber.

Further, provided is the central tension line, further comprising a cover layer configured to surround the core layer and formed of a metal material having electrical conductivity of 55 to 64% IACS.

Further, provided is the central tension line, wherein the metal material comprises an aluminum material; and a thickness of the cover layer is 0.3 to 2.5 mm.

Further, provided is the central tension line, wherein a gap is formed between the core layer and the cover layer.

Further, provided is an overhead power transmission cable comprising the central tension line and a conductor formed by uniting a plurality of aluminum alloy or aluminum wires disposed around the central tension line.

The central tension line for overhead power transmission wires according to the present disclosure includes the detection part including the optical fiber protected by the protective tube, detects whether or not the central tension line is damaged through the detection part by an Optical Time Domain Reflectometer (OTDR) method, and may thus easily and accurately detect whether or not the central tension line is damaged or which position of the central tension line is damaged.

Further, the central tension line according to the present disclosure is formed of a fiber reinforced plastic material including the reinforcing fibers, such as carbon fibers, in the polymer resin, precisely adjusts the cross-sectional area ratio of the detection part formed in the central tension line, and may thus not only have excellent sag properties due to excellent tensile strength of the central tension line so as to prevent the wired overhead power transmission cable from sagging but also improve wiring workability due to sufficient flexibility of the central tension line.

In addition, the central tension line according to the present disclosure may suppress corrosion and damage to conductor wires through an aluminum tube serving as the cover layer, and may thus avoid or minimize increase in the resistance of the overhead power transmission cable and reduction in a transmission capacity thereby.

Moreover, the central tension line according to the present disclosure may achieve reduction in the weight and manufacturing costs of the overhead power transmission cable through application of a material having low specific gravity and low manufacturing costs.

DETAILED DESCRIPTION

Figure 1:
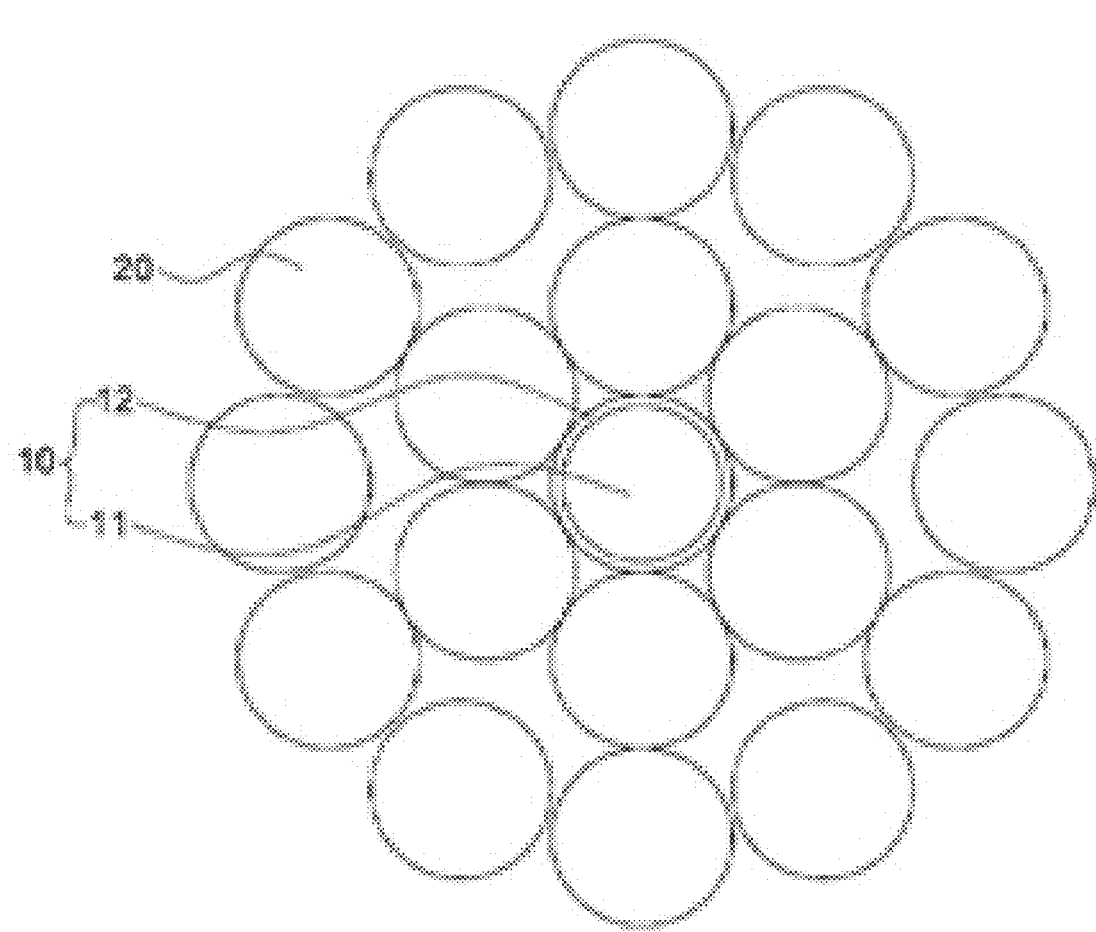
FIG. 1 is a view schematically showing the cross-sectional structure of a conventional overhead power transmission cable.

Hereinafter, reference will be made in detail to preferred embodiments of the present disclosure, examples of which are illustrated in the accompanying drawings. However, the present disclosure is not limited to the embodiments disclosed herein and may be implemented in various different forms. The embodiments are provided to make the description of the present disclosure thorough and to fully convey the scope of the present disclosure to those skilled in the art. The same or similar elements through the specification are denoted by the same reference numerals even though they are depicted in different drawings.

Figure 2:
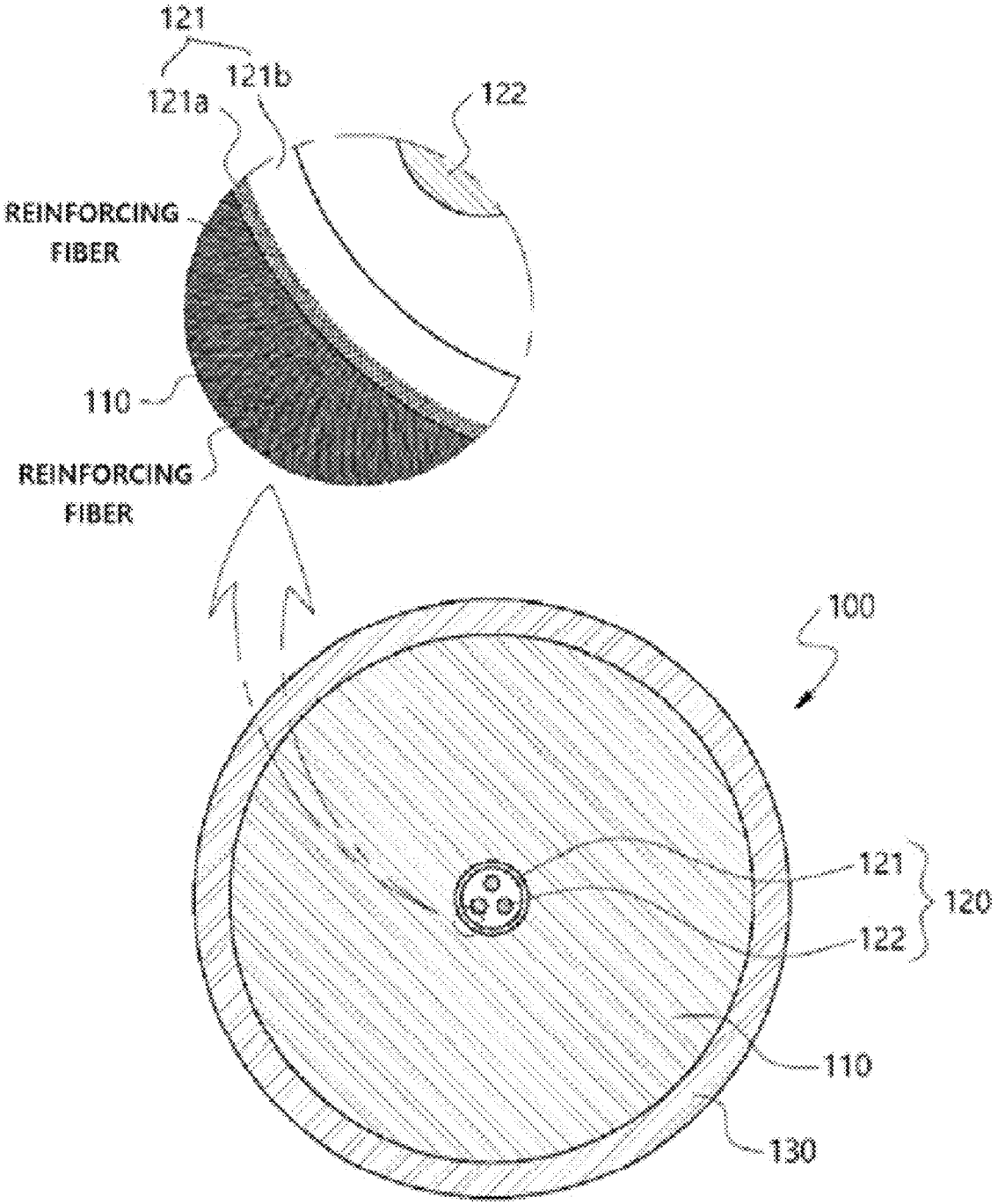
FIG. 2 is a view schematically showing the cross-sectional structure of one embodiment of a central tension line for overhead power transmission cables according to the present disclosure.
Figure 3:
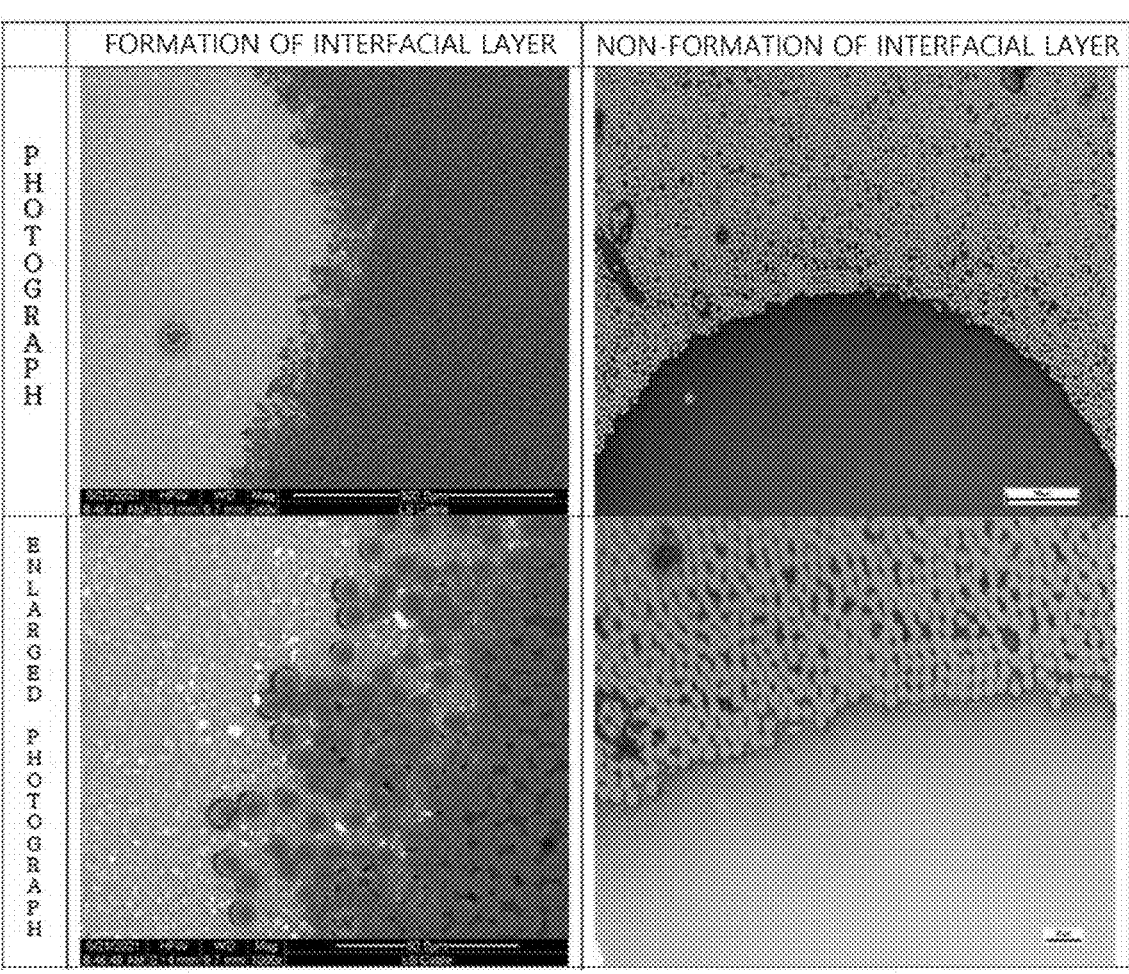
FIG. 3 shows electron micrographs in the case in which an interfacial layer is formed on a protective tube shown in FIG. 2 and in the case in which no interfacial layer is formed on the protective tube.
Figure 4:
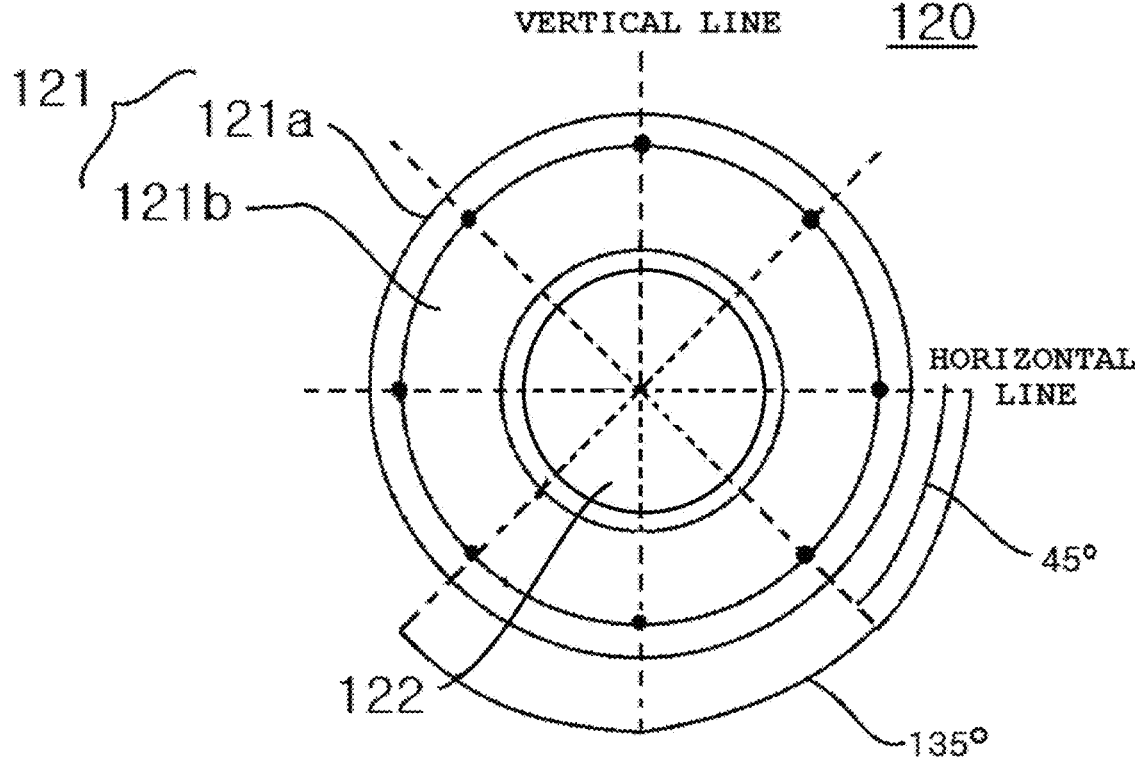
FIG. 4 is a reference view schematically showing a method of measuring the thickness of the interfacial layer on the protective tube shown in FIG. 2.
Figure 5:
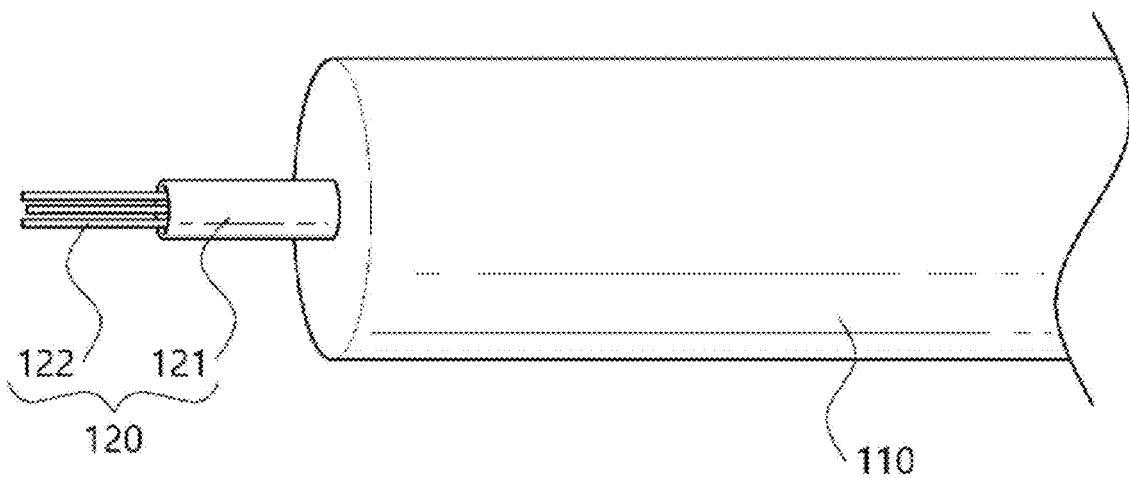
FIG. 5 is a view schematically showing exposure of a detection part at one end of a core layer of the central tension line shown in FIG. 2.

FIG. 2 is a view schematically showing the cross-sectional structure of one embodiment of a central tension line for overhead power transmission cables according to the present disclosure, FIG. 3 shows electron micrographs in the case in which an interfacial layer is formed on a protective tube shown in FIG. 2 and in the case in which no interfacial layer is formed on the protective tube, FIG. 4 a view schematically showing exposure of a detection part at one end of a core layer of the central tension line shown in FIG. 2, and FIG. 5 is a view schematically showing fastening of one end of the central tension line shown in FIG. 4 to a clamp.

As shown in FIGS. 2 and 3, a central tension line 100 for overhead power transmission cables according to the present disclosure may include a core layer 110 formed of fiber reinforced plastic, and a detection part 120 provided in the core layer 110 and including optical fibers 122 inserted into a hollow formed in a protective tube 121, and may optionally additionally include a cover layer 130 configured to surround the core layer 110.

Because tensile force acts on the central tension line 100 in the length direction thereof when an overhead power transmission cable including the central tension line 100 and conductor wires disposed around the central tension line 100 is wired between pylons, the central tension line 10 is formed to continuously extend in the length direction of the overhead power transmission cable, and may thus ensure sufficient tensile strength.

The core layer 110 may be formed of the fiber reinforced plastic including reinforcing fibers in a thermosetting resin matrix. The thermosetting resin matrix may be formed by adding additives, such as a hardener, a hardening accelerator and a release agent, to a base resin, such as an epoxy-based resin, unsaturated polyester resin, a bismaleimide resin and a polyimide resin having a glass transition temperature (Tg) of 205° C. or higher, preferably, an epoxy resin. When the glass transition temperature (Tg) of the base resin is lower than 200° C., heat resistance of the central tension line 100 is insufficient, and may thus not be applied to an overhead power transmission cable having an operating temperature of about 180° C.

The glass transition temperature (Tg) of the base resin may be evaluated using a Dynamic Mechanical Analyzer (DMA), and evaluation equipment may employ DMA equipment from TA instruments, but is not limited thereto.

Particularly, the epoxy resin may include bisphenol A diglycidyl ether, a multifunctional epoxy resin, bisphenol F diglycidyl ether, or the like, preferably a mixture of the above three resins. When the mixture of the above three epoxy resins is used, heat resistance may be improved compared to use of bisphenol A diglycidyl ether alone, and flexural properties and flexibility may be improved.

The hardener may include an acid anhydride-based hardener, such as methyl tetrahydrophthalic anhydride (MTHPA), tetrahydrophthalic anhydride (THPA), hexahydrophthalic anhydride (HHPA) or nadic methyl anhydride (NMA), preferably a liquid hardener, such as methyl tetrahydrophthalic anhydride, nadic methyl anhydride, or an amine-based hardener including an alicyclic polyamine-based compound, such as menthane diamine (MDA) or isophorone diamine (IPDA), or an aliphatic amine-based compound, such as diaminodiphenyl sulphone (DDS) or diaminodiphenyl methane (DDM).

The content of the acid anhydride-based hardener may be 70 to 150 parts by weight, and the content of the amine-based hardener may be 20 to 50 parts by weight, with respect to 100 parts by weight of the base resin, heat resistance of the thermosetting resin matrix may be reduced due to insufficient hardening of the thermosetting resin matrix during hardening, when the content of the acid anhydride-based hardener is less than 70 parts by weight or the content of the amine-based hardener is less than 20 parts by weight, and an unreacted amount of the hardener remains in the thermosetting resin matrix and serves as impurities, and may thus deteriorate heat resistance and other properties of the thermosetting resin matrix, when the content of the acid anhydride-based hardener exceeds 150 parts by weight or the content of the amine-based hardener exceeds 50 parts by weight.

The hardening accelerator promotes hardening of the thermosetting resin matrix by the hardener, and an imidazole-based hardening accelerator may be used when the hardener is an acid anhydride-based hardener, and a boron trifluoride ethylamine-based hardening accelerator may be used when the hardener is an amine-based hardener.

The content of the imidazole-based hardening accelerator may be 1 to 3 parts by weight, and the content of the boron trifluoride ethylamine-based hardening accelerator may be 2 to 4 parts by weight, with respect to 100 parts by weight of the base resin, the completely hardened thermosetting resin matrix may not be obtained, when the content of the imidazole-based hardening accelerator is less than 1 part by weight or the content of the boron trifluoride ethylamine-based hardening accelerator is less than 2 parts by weight, and a hardening time is shortened due to a high reaction speed, and thus, viscosity of the thermosetting resin matrix is rapidly increased and workability of the thermosetting resin matrix is deteriorated, when the content of the imidazole-based hardening accelerator exceeds 3 parts by weight or the content of the boron trifluoride ethylamine-based hardening accelerator exceeds 4 parts by weight.

The release agent reduces friction of the thermosetting resin matrix with molding dies, when the thermosetting resin matrix is produced by molding, so as to facilitate molding processing, and may use, for example, zinc stearate.

The content of the release agent may be 1 to 5 parts by weight with respect to 100 parts by weight of the base resin, workability of the thermosetting resin matrix may be reduced, when the content of the release agent is less than 1 part by weight, and workability of the thermosetting resin matrix may not be additionally improved and manufacturing costs of the thermosetting resin matrix are increased, when the content of the release agent exceeds 5 parts by weight.

The reinforcing fibers may include carbon fibers, synthetic fibers, or the like, and particularly, the carbon fibers are high-strength continuous fibers having a diameter of 3 to 35 μm, and may have tensile strength of 3.5 to 5.0 GPa, an elastic modulus of 140 to 600 GPa, and a coefficient of expansion of 0 μm/m° C. or less. It is difficult to manufacture the carbon fibers and may thus be uneconomical, when the diameter of the carbon fibers is less than 3 μm, and the tensile strength of the carbon fibers may be greatly reduced, when the diameter of the carbon fibers exceeds 35 μm.

The carbon fibers may be surface-treated so as to improve compatibility with the base resin of the thermosetting resin matrix. A coupling agent configured to treat the surfaces of the carbon fibers may employ any coupling agent which may treat the surfaces of high-strength fibers, without being limited thereto, and for example, may include a titanate-based coupling agent, a silane-based coupling agent and a zirconate-based coupling agent, and may include one of these coupling agents or a mixture of two or more of these coupling agents.

A large number of reactive groups is introduced into the surfaces of the carbon fibers surface-treated with the coupling agent, and the reactive groups react with the polymer resin and may thus prevent clumps of the fibers, remove air bubbles or defects causing properties of a final product, and thereby improve interfacial bonding properties between the high-strength carbon fibers and the thermosetting resin and dispersibility of the high-strength carbon fibers.

The total volume ratio of the carbon fibers to the volume of the core layer other than the detection part may be 50 to 85%, preferably 75 to 83%. Here, the total volume ratio of the carbon fibers may be defined as below.

$$\text{Total Volume Ratio (\%) of Carbon Fibers} = \frac{\text{Total Volume of Carbon Fibers}}{\text{Volume of Core Layer other than Detection part}} \times 100$$

Here, when the total volume ratio of the carbon fibers is less than 50%, the tensile strength of the central tension line is insufficient and thus sag properties of the overhead power transmission cable may be deteriorated, and on the contrary, when total the volume ratio of the carbon fibers exceeds 85%, flexibility of the central tension line is insufficient and thus wiring workability of the overhead power transmission cable may be deteriorated, and air bubbles and cracks in the core layer are caused by increase in clumps of the carbon fibers and thus properties and workability of the overhead power transmission cable may be greatly reduced.

The detection part 120 may include the protective tube 121 and one or more optical fibers 122 inserted into the hollow formed in the protective tube 121. The protective tube 121 may employ any tube which has a hollow configured to receive the optical fibers 122 formed therein without being limited to a specific tube, and for example, may employ an insulating tube formed of a polymer resin, preferably polybutylene terephthalate (PBT) or polyvinyl chloride (PVC), having tensile strength of 60 MPa or more, elongation of 5% or more, a tensile modulus of 2,000 MPa or more, flexural strength of 90 MPa or more, a flexural modulus of 2,500 MPa or more, preferably polyvinyl chloride (PVC) having a melting point of 100 to 260° C. and a glass transition temperature of 80 to 82° C., and the inside of the protective tube 121 may be selectively filled with a jelly compound configured to protect the optical fibers 122.

The detection part 120 may include a gap between the protective tube 121 and the optical fibers 122, as shown in FIG. 2. OTDR equipment may be connected to the optical fibers 122 by exposing the optical fibers 122 by partially removing the core layer 110 from the end of the central tension line 100, and bonding force sufficient to allow the optical fibers 122 and the protective tube 121 to separately behave is required to easily expose the optical fibers 122, and therefore, it is advantageous to form the gap between the optical fibers 122 and the protective tube 121, in exposure of the optical fibers 122.

Further, the gap formed between the protective tube 121 and the optical fibers 122 must satisfy a designated area, fracture of the core layer 110 may not be detected well when the gap is excessively large, and the optical fibers 122 may fracture in the case of sagging of the overhead power transmission cable d when the gap is excessively small. Preferably, the gap may be formed such that the space factor of the optical fibers 122 in the space within the protective tube 121 maintains 50 to 90%.

Particularly, the protective tube 121 may include an interfacial layer 121*a* configured such that the reinforcing fibers included in the core layer 110 penetrate into some areas of the surface thereof, and an inner layer 121*b* configured the reinforcing fibers do not penetrate thereinto, as shown in FIGS. 2 and 3, by adjusting process conditions during an extrusion process of the central tension line 100. That is, the interfacial layer 121*a* may indicate a layer in which the polymer resin forming the protective tube 121 and the reinforcing fibers are mixed. By forming the interfacial layer 121 in this manner, coupling strength between the core layer 110 and the protective tube 121 may be reinforced. Consequently, the core layer 110 and the detection part 120 are very tightly coupled to each other so as to behave integrally, coupling between the core layer 110 and the protective tube 121 is maintained even when the core layer 110 fractures, impact is transmitted to the optical fibers 122 in the detection part 12 as intact as possible, and therefore, whether or not the core layer 110 fractures may be more accurately detected.

Here, the interfacial layer 121*a* is formed by causing the reinforcing fibers to penetrate the polymer resin forming the protective tube 121, and a ratio of a length occupied by the interfacial layer to the outer circumference of the protective tube 121 may be equal to or greater than 60%, in an arbitrary cross section of the protective tube 121.

Further, preferably, in an arbitrary cross section of the protective tube 121, the interfacial layer 121*a* may include an area having a thickness of 5 μm or more, and more preferably, the average thickness of the interfacial layer 121*a* may be equal to or greater than 5 μm, for example, 5 μm to less than the overall thickness of the protective tube 121.

Here, the average thickness of the interfacial layer 121*a* may indicate the average value of thicknesses of the interfacial layer 121*a* measured at eight points at which a horizontal line, a vertical line, a diagonal line forming an angle of 45° with the horizontal line, and a diagonal line forming an angle of 135° with the horizontal line, passing through the center of the detection part 120, meet with the interfacial layer 121*a*, as shown in FIG. 4.

Here, when the ratio of the length occupied by the interfacial layer 121*a* to the entirety of the outer circumference of the protective tube 121 is less than 60%, when the interfacial layer 121*a* does not include an area having a thickness of 5 μm or more, or when the average thickness of the interfacial layer 121*a* is less than 5 μm, for example, tight coupling between the protective tube 121 and the core layer 110 is insufficient, the core layer 110 and the detection part 120 may separately behave, and thus, it may be difficult to accurately detect whether or not the core layer 110 fractures. That is, although the core layer 110 fractures due to impact applied to the core layer 110, the impact may not be transmitted to the optical fibers 122 in the detection part 120, and thus, fracture of the core layer 110 may not be detected.

In order to form such an interfacial layer 121*a*, the reinforcing fibers in the core layer 110 may at least partially penetrate into the protective tube 121 by hardening the core layer 110 extruded outside the protective tube 121 under specific hardening conditions, for example, at a hardening temperature of 50 to 250° C., preferably 150 to 200° C., and a hardening speed of 0.5 to 2.0 mpm, preferably 0.6 to 1.2 mpm.

Figure 6:
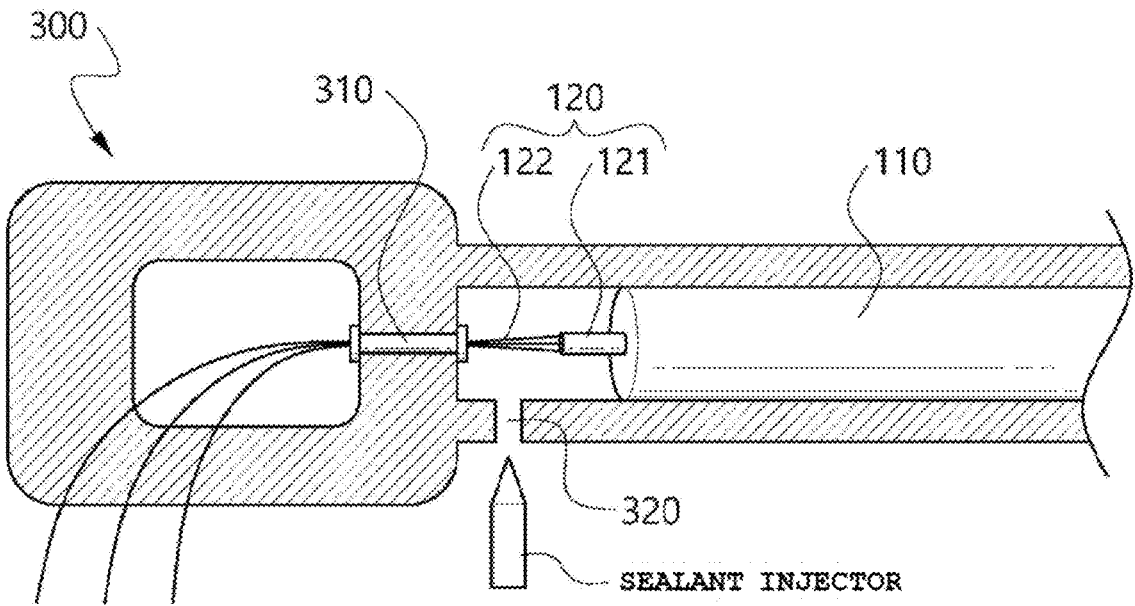
FIG. 6 is a view schematically showing fastening of one end of the central tension line shown in FIG. 5 to a clamp.

Just before installing the overhead power transmission cable on a pylon, just before an operation of clamping one end of the overhead power transmission cable at the pylon, or after installing the overhead power transmission cable on the pylon, a worker may connect the optical fibers 122 exposed from one end of the central tension line to the OTDR equipment, as shown in FIGS. 5 and 6.

Figure 7:
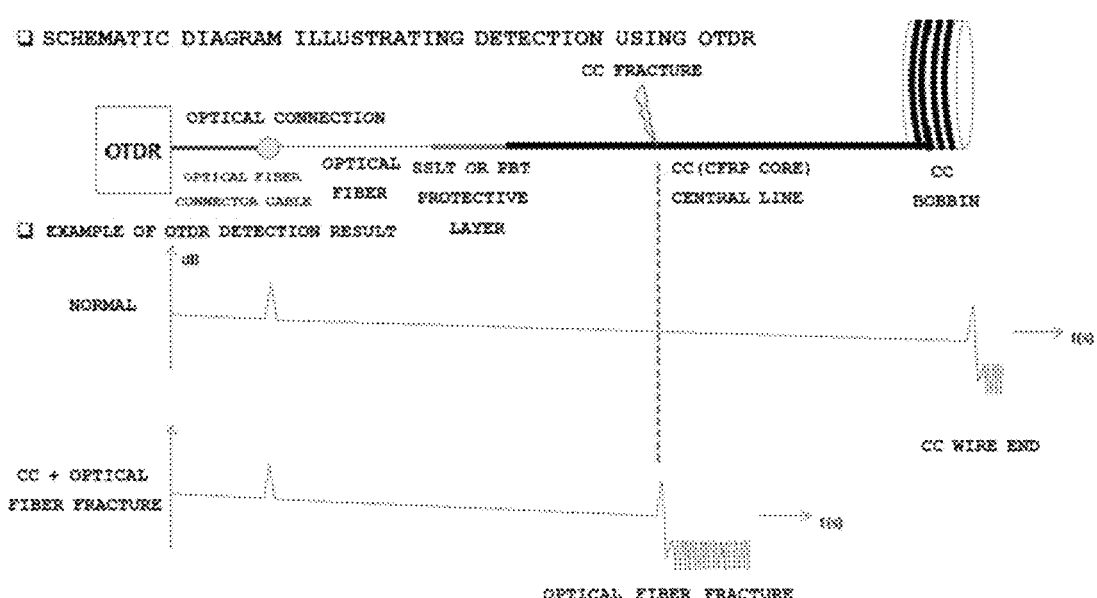
FIG. 7 is a schematic view illustrating one example of detection as to whether or not the central tension line is damaged by an Optical Time Domain Reflectometer (OTDR) method.

Here, in order to detect whether or not the central tension line 100 is damaged after installing the overhead power transmission cable on the pylon, a clamp 300 connected to the end of the overhead power transmission cable may include an element, such as a hole 310 configured to expose the optical fibers 122 to the outside, and in this case, penetration of moisture or the like may be prevented by injecting a sealant, such as grease, into the clamp 300 through another hole 320 formed through the clamp 300, after inserting the optical fibers 122 into the hole 310 so as to expose the optical fibers 122 to the outside. Therefore, whether or not the central tension line 100 is damaged may be detected by connecting the optical fibers 122 exposed to the outside through the hole 310 to the OTDR equipment. FIG. 7 is a is a schematic view illustrating an example of detection as to whether or not the central tension line is damaged by an Optical Time Domain Reflectometer (OTDR) method.

As shown in FIG. 7, whether or not the optical fibers fracture or the position of fracture of the optical fibers may be detected by measuring optical loss due to fracture of the optical fibers through the OTDR equipment by inputting an optical signal to one end of each of the optical fibers and receiving the optical signal reflected and returned from the other ends of the optical fibers in the state in which the optical fibers exposed from one end of the cable are connected to an optical fiber connector cable, and such fracture of the optical fibers is caused by damage to the central tension line, and thus, not only whether or not the central tension line is damaged but also the damaged position of the central tension line may be detected based on a measured value of the optical fibers.

That is, in the case of a normal central tension line, the intensity of a signal is changed at the end of the central tension line which is clamped, but in the case in which the middle portion of a central tension line fractures, the intensity of a signal is changed at a position of the central tension line where the fracture occurs. That is, the position of the central tension line where the fracture occurs may be recognized as the end of the central tension line. Therefore, it is possible to detect whether or not the central tension line is damaged and the damaged position of the central tension line by recognizing a change in the intensity of the signal and the position of the central tension line where the change in the intensity of the signal occurs.

In the conventional technology in which optical fibers are embedded in a central tension line without a separate protective tube, there is no method of exposing the optical fibers from one end of the central tension line, application of the OTDR equipment is not possible, and therefore, whether or not the optical fibers are damaged may be detected, but the damaged position of the optical fibers may not be detected.

Here, the ratio of the overall cross-sectional area of the detection part 120 to the total cross-sectional area of the core layer 110 may be 1 to 12% in an arbitrary cross section of the central tension line. For example, the overall diameter of the detection part 120 may be 0.9 to 3.0 mm in the arbitrary cross section of the central tension line. When the cross-sectional area ratio of the detection part 120 is less than 1%, the detection part 120 may not be affected by damage to the core layer 110 and thus it is difficult to detect damage to the core layer 110, and when the cross-sectional area ratio of the detection part 120 exceeds 12%, the tensile strength of the core layer 110 may be greatly reduced.

Here, the central tension line including the detection part may ensure sag properties so as to prevent the overhead power transmission cable from sagging only when the tensile strength of the central tension line is equal to or greater than 2,800 MPa.

Figure 8:
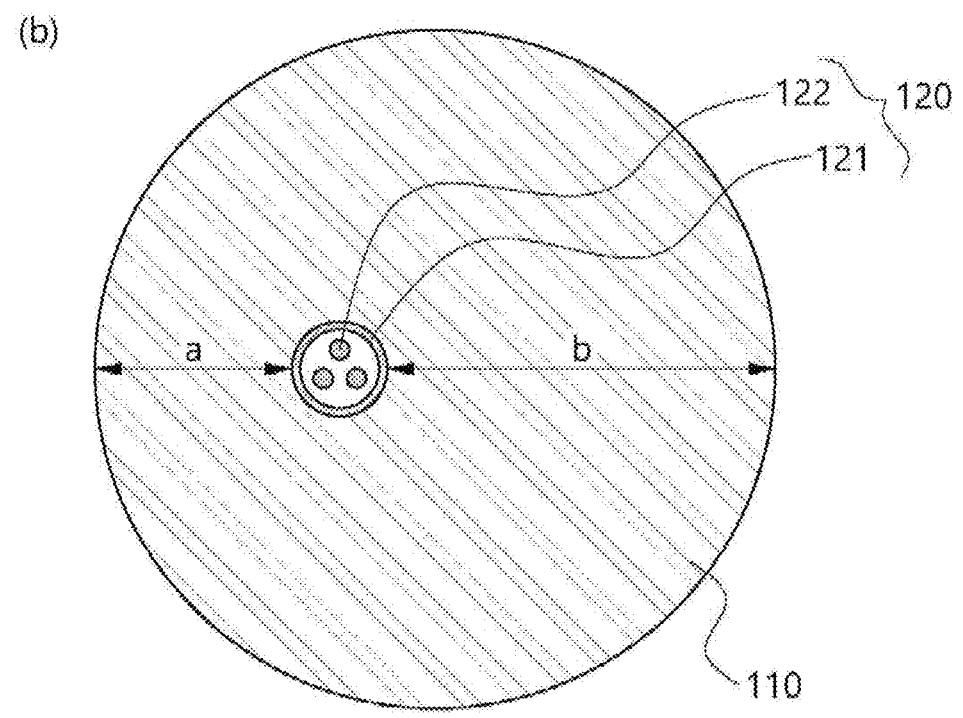
FIG. 8 schematically shows embodiments of a position of the detection part in the core layer of the central tension line shown in FIG. 2.

FIG. 8 schematically shows embodiments of the position of the detection part in the core layer of the central tension line shown in FIG. 2.

As shown in FIG. 8, relations between the maximum distance b and the minimum distance a among distances from the detection part 120 to the surface of the core layer 110 within the core layer 110 of the central tension line 100 may satisfy Equation 1 below.

$$0 \leq (b - a) \leq (50\% \text{ of Outer Diameter of Core Layer}) \quad \text{[Equation 1]}$$

Here, among the maximum distance b and the minimum distance a, the longest one of the distances between the surface of the detection part 120 and the surface of the core layer 110 is defined as the maximum distance b, and the shortest one is defined as the minimum distance a.

Concretely, as shown in FIG. 8a, when a distance between the maximum distance b and the minimum distance a is equal to or less than 50% of the outer diameter of the core layer 110, that is, when a degree of eccentricity of the detection part 120 in the core layer 110 is equal to or less than a designated level, detection of damage to the central tension line 100 by the detection part 120 may be stably performed, a decrease in the tensile strength of the central tension line 100 may be minimized, and exposure of the optical fibers 122 from the core layer 110 may be further facilitated. According to a more preferable embodiment, there is no difference between the maximum distance b and the minimum distance a, and in this case, eccentricity of the detection part 120 in the core layer 110 does not occur. As shown in FIG. 8b, when the distance between the maximum distance b and the minimum distance a exceeds 50% of the outer diameter of the core layer 110, that is, when the degree of eccentricity of the detection part 120 to one side in the core layer 110 exceeds the designated level, detection of damage to the central tension line 100 by the detection part 120 may not be stably performed, the tensile strength of the central tension line 100 may be greatly reduced, and it may be difficult to expose the optical fibers 122 from the core layer 110.

Further, the cover layer 130 may be included in the central tension line 100, or may be included in a conductor together with aluminum wires 200, which will be described below.

The cover layer 130 may additionally suppress damage to the conductor wires due to contact and friction between the core layer 110 and the conductor wires and, when the cover layer 130 is formed of a metal material having excellent electrical conductivity, for example, having electrical conductivity of 55 to 64% IACS, preferably the same aluminum material as the conductor wires, the cover layer 130 is electrically connected to the conductor wires disposed around the central tension line 100, and may thus reduce the overall resistance of the overhead power transmission cable and additionally perform a function of improving a transmission capacity.

Here, the thickness of the cover layer 130 may be 0.3 to 2.5 mm, an overall resistance reduction effect of the overhead power transmission wire is insignificant, when the thickness of the cover layer 130 is less than 0.3 mm, and on the contrary, it is difficult to manufacture the central tension line 100, the outer diameter of the core layer 110 based on the central tension line 100 having the same outer diameter is reduced, the tensile strength of the central tension line 100 is reduced, and excellent sag properties of the central tension line 100 so as to allow low sagging of the overhead power transmission cable may not be achieved, when the thickness of the cover layer 130 exceeds 2.5 mm.

Figure 9:
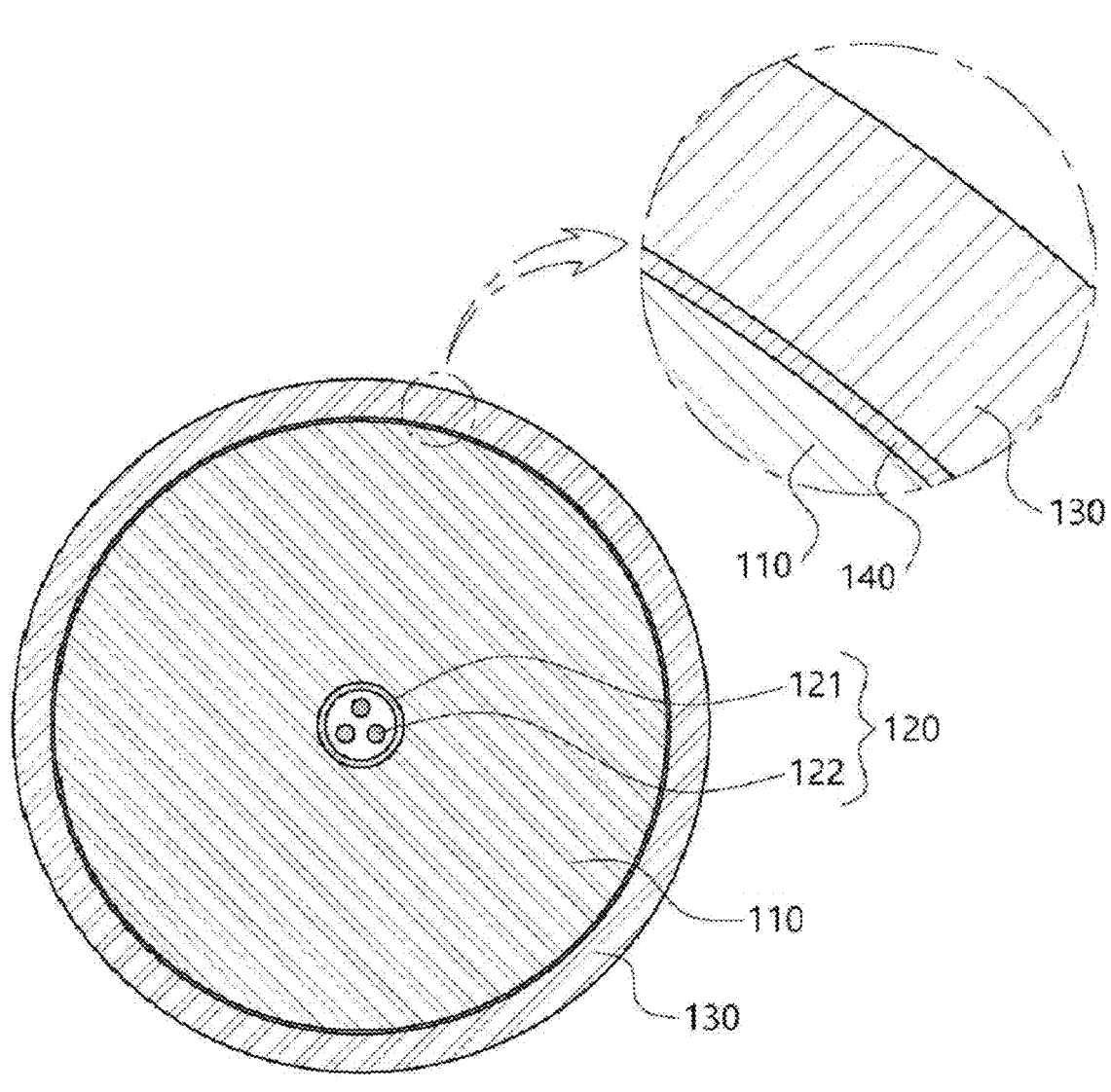
FIG. 9 is a view schematically showing the cross-sectional structure of another embodiment of the central tension line according to the present disclosure.

When the central tension line 100 additionally includes the cover layer 130, a gap 140 may be formed between the core layer 110 and the cover layer 130, as shown in FIG. 9. The cover layer 130 may be formed through Conform extrusion using a metal rod, such as aluminum, or through welding using a metal tape, such as aluminum, and particularly, the cover layer 130 may be formed through Conform extrusion using an aluminum rod, the cover layer 130 may be formed to a long distance, and thereby, productivity of the cover layer 130 may be improved, and it may be easy to form and adjust the gap 140.

Further, when Conform extrusion is performed, the cover layer 130 having a continuously formed plane without joints, such as welded parts, may be formed, and therefore, galvanic corrosion, caused by damage to the joints due to bending stress applied to the central tension line 100 while manufacturing or wiring the central tension line 100 or the overhead power transmission cable having the same or after wiring the central tension line 100 or the overhead power transmission cable, may be prevented.

The cover layer 130 and the gap 140 may be formed by extruding a metal material or the like into a tube type. Concretely, the cover layer 130 may be formed by extruding the metal material having an inner diameter greater than the outer diameter of the cover layer 130 into the form of a tube and then reducing the diameter of the tube in stages, and the size of the gap 140 may be adjusted, for example, the total cross-sectional area of the gap 140 may be about 0.15 to 7.1 mm$^2$.

Therefore, deterioration of the core layer 110 may be prevented by suppressing transmission of heat to the core layer 110 during Conform extrusion using the aluminum rod for formation of the cover layer 130, and the core layer 110 and the cover layer 120 may separately behave due to the gap 140 when bending stress is applied to the central tension line 100, thereby allowing most of the bending stress to be applied to the core layer 110 including a fiber reinforced plastic wire having relatively high tensile strength so as to achieve low sagging the overhead power transmission cable, and minimizing stress applied to the cover layer 130 formed of an aluminum material having relatively low tensile strength so as to suppress damage to the central tension line 100 during winding of the central tension line 100 on a bobbin, a drum, a pulley or the like in order to manufacture or wire the overhead power transmission cable.

Figure 10:
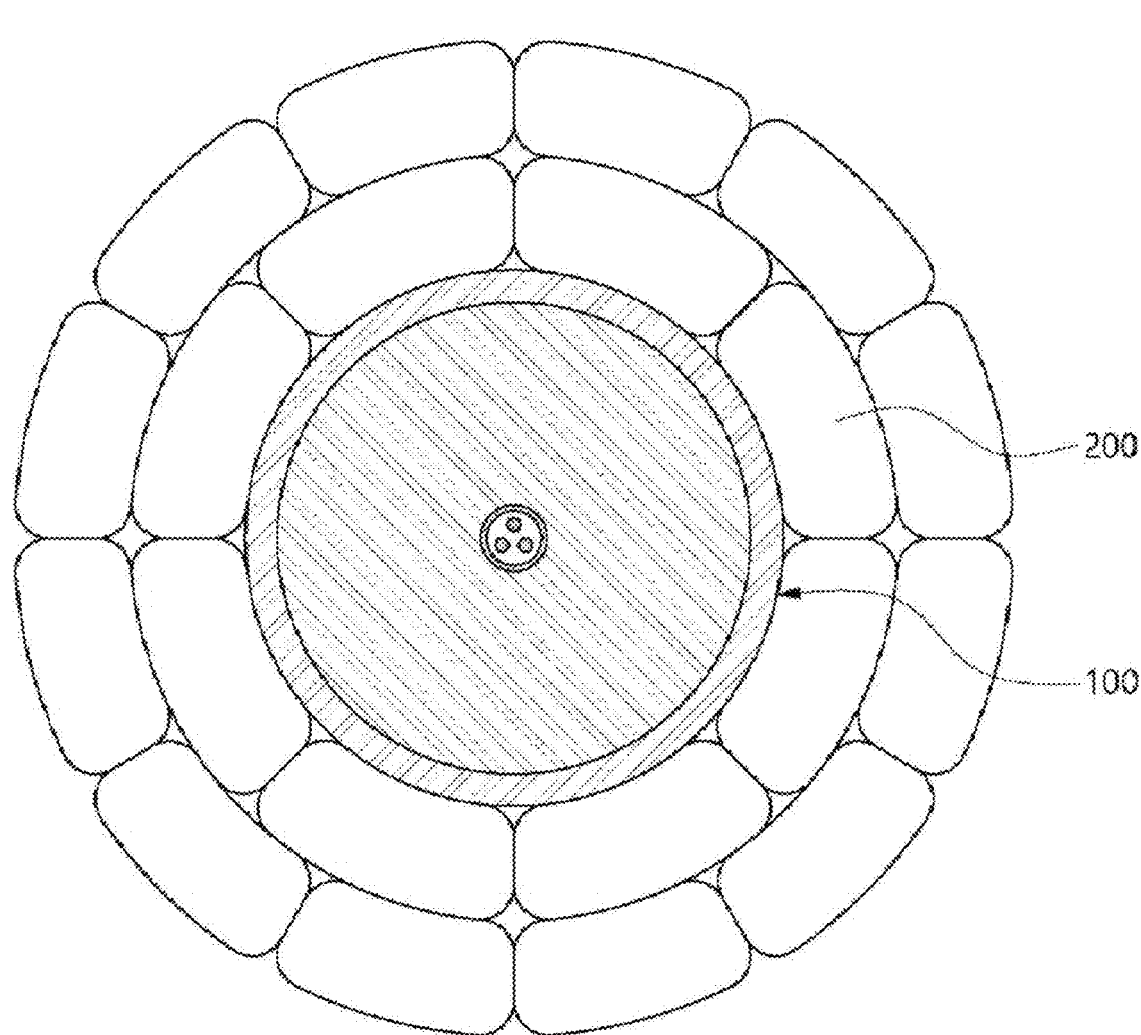
FIG. 10 is a view schematically showing the cross-sectional structure of one embodiment of an overhead power transmission cable according to the present disclosure, including the central tension line shown in FIG. 2.

FIG. 10 is a view schematically showing the cross-sectional structure of one embodiment of the overhead power transmission cable according to the present disclosure, including the central tension line shown in FIG. 2.

As shown in FIG. 10, the overhead power transmission cable according to the present disclosure may be formed by disposing the conductor, formed by uniting a plurality of aluminum alloy or aluminum wires 200, around the central tension line 100.

The aluminum wires 200 may be formed of 1000 series aluminum, such as 1050, 1100 or 1200 aluminum, or an aluminum-zinc alloy, the tensile strength and elongation of the aluminum wires 200 before heat treatment may be about 15 to 25 kgf/mm$^2$ and be less than about 5%, and the tensile strength and elongation of the aluminum wires 200 after heat treatment may be less than about 9 kgf/mm$^2$ and be equal to or greater than about 20%.

Further, the aluminum wires 200 have a trapezoidal cross section and have a remarkably increased space factor of the conductor compared to the conventional aluminum wires having a circular section cross for overhead power transmission cables, thereby being capable of maximizing the transmission capacity and transmission efficiency of the overhead power transmission cable. For example, the space factor of the conductor including the conventional aluminum wires having the circular cross section is about 75%, and the space factor of the conductor including the aluminum wires having the trapezoidal cross section is about 95% or more.

The aluminum wires 200 may be formed to have a trapezoidal cross section by Conform extrusion using trapezoidal dies or by wire drawing. When the aluminum wires 200 are formed by Conform extrusion, heat treatment is naturally performed during the extrusion process and thus separate heat treatment is not t required, but when the aluminum wires 200 are formed by wire drawing, separate heat treatment may be subsequently performed.

The aluminum wires 200 are heat-treated during the Conform extrusion process or are subsequently heat-treated after the wire drawing process, areas on which stress formed in an aluminum structure due to torsion during the extrusion or wire drawing process and obstructing the flow of electrons is concentrated may be released, and thereby, electrical conductivity of the aluminum wires 200 may be improved, and consequently, the transmission capacity and transmission efficiency of the overhead power transmission cable may be improved.

The cross-sectional area and number of the aluminum wires 200 may be properly selected depending on standards of the overhead power transmission cable, and for example, the cross-sectional area of the aluminum wires 200 may be 3.14 to 50.24 mm$^2$, and when the aluminum wires 200 having the trapezoidal cross section are converted into aluminum wires having a circular cross section, the diameter of the cross section of the converted aluminum wires may be 2 to 8 mm.

Further, the number of the aluminum wires 200 may be 12 to 40, and preferably, the aluminum wires 200 may be disposed in a multilayer structure including 8 aluminum wires as a core layer and 12 aluminum wires as a cover layer.

The aluminum wires 20 may be heat-treated so as to improve electrical conductivity, as described above, and when heat treatment is performed, the aluminum wires 20 are softened so that the surfaces thereof are vulnerable to scratches, a large number of scratches may be formed on the surfaces of the aluminum wires 200 due to external pressure or impact during manufacturing, transporting and wiring processes of the overhead power transmission cable, and thereby, when the overhead power transmission cable is operated, corona discharge occurs and may thus cause high frequency noise.

Therefore, a surface hardness reinforcing layer may be formed on the surfaces of the aluminum wires 200 so as to suppress scratch formation on the surfaces of the aluminum wires 200. Preferably, the thickness of the surface hardness reinforcing layer may be equal to or greater than 5 μm, preferably may exceed 10 μm but be equal to or less than 50 μm. When the thickness of the surface hardness reinforcing layer is less than 5 μm, the surface hardness of the aluminum wires 200 may not be sufficiently improved and thus a large number of scratches may be formed on the surfaces of the aluminum wires 200 due to external pressure or impact during the manufacturing, transporting and wiring processes of the overhead power transmission cable, and on the contrary, when the thickness of the surface hardness reinforcing layer exceeds 50 μm, the surface hardness reinforcing layer may be locally damaged or cracked due to bending of the overhead power transmission cable, such as winding of the overhead power transmission cable on a bobbin.

Further, the tensile strength of the overhead power transmission cable may be further improved by forming the surface hardness reinforcing layer on the surfaces of the aluminum wires 200, and consequently, sagging of the overhead power transmission cable may be further suppressed.

The surface hardness reinforcing layer may be formed on the surfaces of all of a plurality of aluminum wires 200 forming the overhead power transmission cable, preferably may be formed on the entire surfaces of the respective aluminum wires 200 provided as the outermost layer among the plurality of aluminum wires 200, and more preferably, may be formed on outer parts which form the outer circumference of the overhead power transmission cable, of the surfaces of the respective aluminum wires 200 provided as the outermost layer.

The surface hardness reinforcing layer may include any film which may improve the hardness of the surfaces of the aluminum wires 200 so as to suppress formation of scratches thereon without being limited to a specific film, for example, an aluminum oxide film formed through anodization, or a plating film, such as nickel (Ni), tin (Sn) or the like.

Concretely, a method of anodizing the surfaces of the aluminum wires 200 may include a process of cleaning the surfaces of the aluminum wires 200 so as to remove organic contaminants, such as grease, from the surfaces of the aluminum wires 200, a process of rinsing the surfaces of the aluminum wires 20 with clean water, a process of etching the surfaces of the aluminum wires 200 so as to remove aluminum oxide from the surfaces of the aluminum wires 200 with sodium hydroxide or the like, a process of desmutting the surfaces of the aluminum wires 200 so as to dissolve and remove an remaining alloy component from the surfaces of the aluminum wires 200 after etching, a process of re-rinsing the surfaces of the aluminum wires 20 with clean water, a process of anodizing the surfaces of the aluminum wires 200 while applying a voltage of 20 to 40 V so as to form a dense and stable aluminum oxide film on the surfaces of the aluminum wires 200, a process of re-rinsing the surfaces of the aluminum wires 200 with clean water, and a process of drying the surfaces of the aluminum wires 200 using air at normal temperature.

When the surface hardness reinforcing layer includes an aluminum oxide film formed through anodization, power loss may be reduced due to insulation effect between the aluminum wires 200 caused by excellent insulation properties of the aluminum oxide film, and a current capacity may be increased due to rapid discharge of Joule heat generated during power transmission caused by high radiation properties of the aluminum oxide film.

Further, the surface hardness reinforcing layer may be additionally coated with a polymer resin, such as a fluorine resin. The polymer resin provides superhydrophobic effects to the aluminum oxide film, and may thus suppress adsorption of dust or contaminants in the atmosphere or accumulation of snow or formation of ice in the winter on the surface of the overhead power transmission cable.

The surface hardness reinforcing layer may include both an aluminum oxide film formed through anodization, and a plating film, such as nickel (Ni), tin (Sn) or the like. When the surface hardness reinforcing layer includes both the aluminum oxide film and the plating film, the aluminum oxide film may be disposed as a lower film and the plating film may be disposed on the aluminum oxide film, and a thickness ratio of the aluminum oxide film to the plating film may be about 3:1 to 5:1.

When the thickness ratio of the aluminum oxide film to the plating film is 3:1 to 5:1, the hardness of the surfaces of the aluminum wires 200 may be sufficiently improved by the aluminum oxide film having a relatively great thickness and relatively excellent surface hardness improvement effect, and local cracks of or damage to the surface hardness reinforcing layer may be effectively suppressed by the plating film disposed outside and having relatively low risk of cracks or damage with respect to bending, when the overhead power transmission cable is bent, i.e., is wound on a bobbin.

EXAMPLES

1. Fracture Test Depending on Formation of Interfacial Layer

A fracture test was performed by performing a bending test on a central tension line specimen configured such that an interfacial layer which carbon fibers penetrate is formed on at least a part of a protective tube, and a central tension line sample configured such that no interfacial layer is formed on a protective tube, prepared by differently adjusting hardening conditions for core layers.

Figure 11:
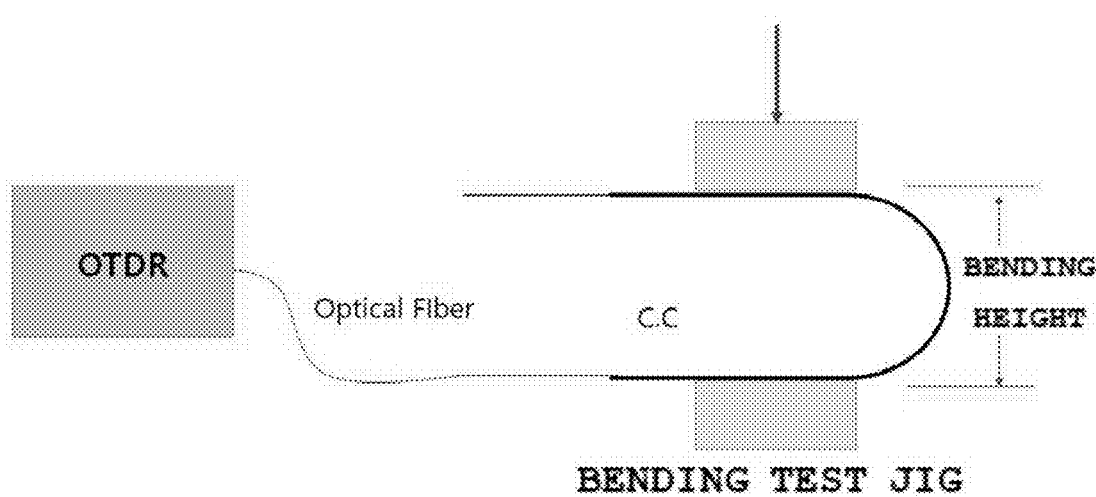
FIG. 11 shows a method of testing bending of a central tension line and a graph representing data detected by an OTDR in the case in which an interfacial layer is formed on a protective tube in one example.
Figure 11:
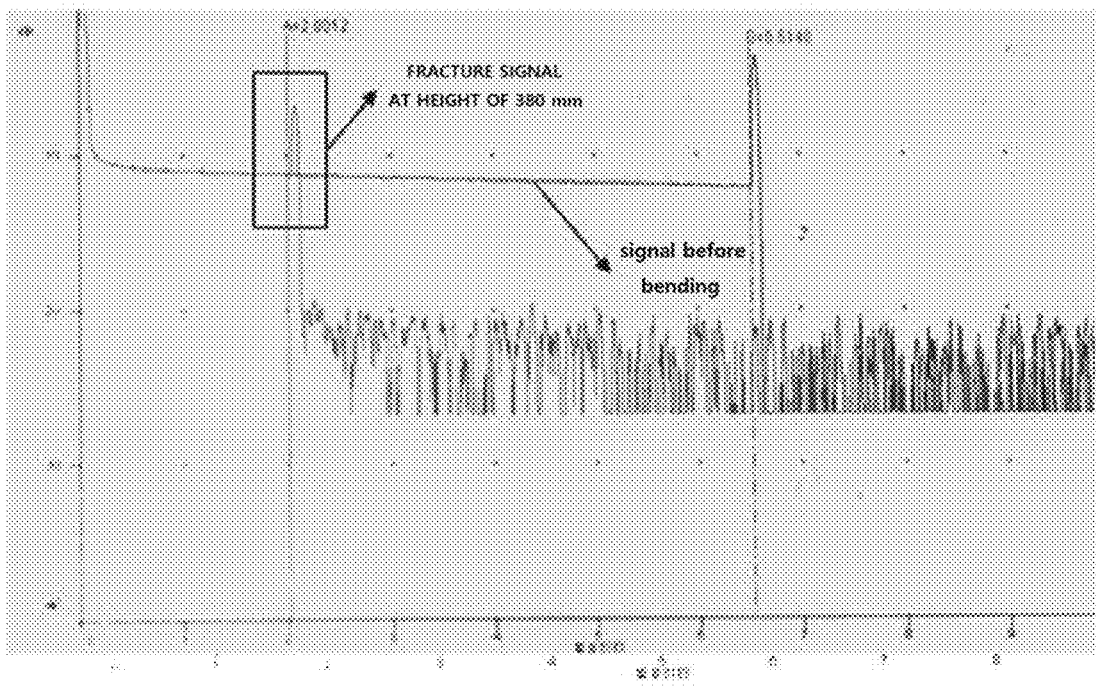

Here, central tension lines having a length of 90 m were used, a core layer of each of the central tension lines was connected to a bending test jig, and bending was applied to each of the central tension lines while reducing a bending height from 700 mm to 300 mm, as shown in FIG. 11.

The fracture test was performed by performing the bending test on the central tension line specimen having the interfacial layer according to the present disclosure in the state in which the OTDR equipment was connected to an optical fiber exposed by partially removing the core layer from one end of the central tension line specimen, and data detected by the OTDR equipment is shown in FIG. 11. Referring to FIG. 11, when the central tension line does not fracture, the intensity of a signal is changed at one end of the central tension line which is clamped, as shown in an upper graph in FIG. 11, but when a middle portion of the central tension line fractures by bending the central tension line at a bending height of about 380 mm, the intensity of the signal is changed at a position of the central tension line where the fracture occurs. That is, it was confirmed that the optical fiber fractures together with fracture of the central tension line, and thereby, it is possible to detect whether or not the central tension line fractures.

Figure 12:
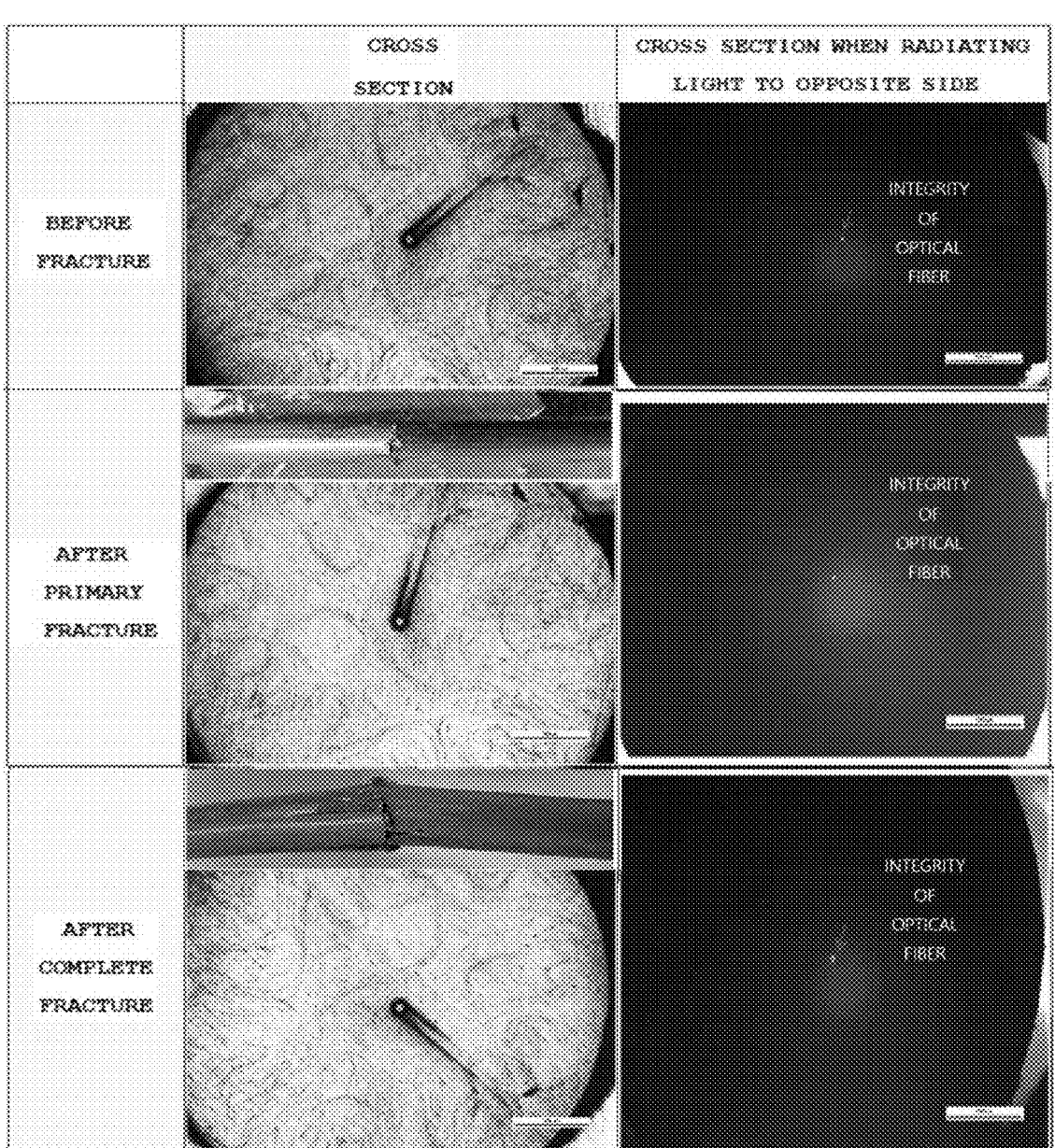
FIG. 12 illustrates photographs showing results of a fracture test in the case in which no interfacial layer is formed on a protective tube in another example.

Further, while the fracture test was performed by performing the bending test on the central tension line specimen having no interfacial layer, whether or not an optical fiber fractures was observed by radiating light to one end of the optical fiber and then detecting reflected light at the other end of the optical fiber through an optical microscope, and results of the test are shown in FIG. 12. As shown in FIG. 12, it was confirmed that, although the core layer of the central tension line fractures, the optical fiber does not fracture and therefore, it is not possible to detect whether or not the central tension line fractures.

2. Tensile Strength Evaluation of Central Tension Line Depending on Cross-Sectional Area Ratio of Detection Part Central tension line samples with specifications set forth in Table 1 below were manufactured, and tensile strengths of the respective central tension line samples were measured. Here, a central tension line including a detection part may ensure sag properties so as to prevent an overhead power transmission cable from sagging only when the tensile strength of the central tension line is equal to or greater than 2,800 MPa.

TABLE 1

| | Outer diameter of core layer (mm) | Cross-sectional area of core layer (mm²) | Tensile strength of core layer (except detection part) (MPa) | Outer diameter of detection part (mm) | Cross-sectional area ratio of detection part (%) | Tensile strength of central tension line (MPa) |
|---|---|---|---|---|---|---|
| Example 1 | 5.5 | 23.8 | 3,200 | 1.5 | 7 | 2,962 |
| Example 2 | 5.5 | 23.8 | 3,200 | 0.9 | 3 | 3,114 |
| Example 3 | 6.0 | 28.3 | 3,200 | 1.5 | 6 | 3,000 |
| Example 4 | 6.0 | 28.3 | 3,200 | 0.9 | 2 | 3,128 |
| Example 5 | 6.5 | 33.2 | 3,200 | 1.5 | 5 | 3,030 |
| Example 6 | 6.5 | 33.2 | 3,200 | 0.9 | 2 | 3,139 |
| Example 7 | 7.0 | 38.5 | 3,200 | 2.4 | 12 | 2,824 |
| Example 8 | 7.0 | 38.5 | 3,200 | 1.5 | 5 | 3,053 |
| Example 9 | 7.0 | 38.5 | 3,200 | 0.9 | 2 | 3,147 |
| Example 10 | 7.5 | 44.2 | 3,200 | 2.4 | 10 | 2,872 |
| Example 11 | 7.5 | 44.2 | 3,200 | 1.5 | 4 | 3,072 |
| Example 12 | 7.5 | 44.2 | 3,200 | 0.9 | 1 | 3,154 |
| Example 13 | 8.0 | 50.3 | 3,200 | 2.4 | 9 | 2,912 |
| Example 14 | 8.0 | 50.3 | 3,200 | 1.5 | 4 | 3,088 |
| Example 15 | 8.0 | 50.3 | 3,200 | 0.9 | 1 | 3,160 |
| Example 16 | 8.5 | 56.7 | 3,200 | 2.4 | 8 | 2,945 |
| Example 17 | 8.5 | 56.7 | 3,200 | 1.5 | 3 | 3,100 |
| Example 18 | 8.5 | 56.7 | 3,200 | 0.9 | 1 | 3,164 |
| Example 19 | 8.5 | 56.7 | 3,200 | 3.0 | 12 | 2,801 |
| Comparative example 1 | 5.5 | 23.8 | 3,200 | 2.4 | 19 | 2,591 |
| Comparative example 2 | 6.0 | 28.3 | 3,200 | 2.4 | 16 | 2,688 |
| Comparative example 3 | 6.5 | 33.2 | 3,200 | 2.4 | 14 | 2,764 |
| Comparative example 4 | 7.0 | 38.5 | 3,200 | 3.0 | 18 | 2,612 |
| Comparative example 5 | 7.5 | 44.2 | 3,200 | 3.0 | 16 | 2,688 |
| Comparative example 6 | 8.0 | 50.3 | 3,200 | 3.0 | 14 | 2,750 |
| Comparative example 7 | 8.5 | 56.7 | 3,200 | 3.2 | 14 | 2,746 |

As set forth in Table 1 above, it was confirmed that the central tension line according to the present disclosure ensures sufficient tensile strength of 2,800 MPa or more by adjusting the ratio of the cross-sectional area of the detection part to the cross-sectional area of the core layer to 1 to 12%.

However, it was confirmed that, in Comparative Examples 1 to 7 in which the ratio of the cross-sectional area of the detection part to the cross-sectional area of the core layer exceeds 12%, the corresponding central tension line has tensile strength below 2,800 MPa and may thus not function as a central tension line having sufficient sag properties.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims. Therefore, it is to be understood that modifications basically including elements disclosed the claims of the present disclosure are deemed to fall within the technical scope of the present disclosure.

The invention claimed is:

1. A central tension line for overhead power transmission cables, comprising:
   a core layer comprising fiber reinforced plastic comprising reinforcing fibers in a thermosetting resin matrix; and
   a detection part inserted into the core layer and comprising at least one optical fiber and a protective tube configured to surround the at least one optical fiber,
   wherein the protective tube comprises an interfacial layer configured such that the reinforcing fibers comprised in the core layer penetrate thereinto, and an inner layer configured such that the reinforcing fibers do not penetrate thereinto,
   wherein the interfacial layer comprises an area having a thickness of 5 micrometers (μm) or more, in an arbitrary cross section of the protective tube.

2. The central tension line according to claim 1, wherein the interfacial layer is configured such that a polymer resin configured to form the protective tube and the reinforcing fibers are mixed.

3. The central tension line according to claim 2, wherein a ratio of a length occupied by the interfacial layer to an outer circumference of the protective tube is equal to or greater than 60%, in an arbitrary cross section of the protective tube.

4. The central tension line according to claim 2, wherein an average thickness of the interfacial layer is equal to or greater than 5 μm, in an arbitrary cross section of the protective tube.

5. The central tension line according to claim 1, wherein a ratio of a cross-sectional area of the detection part to a cross-sectional area of the core layer to 1 to 12%, in an arbitrary cross section of the protective tube.

6. The central tension line according to claim 5, wherein tensile strength of the central tension line comprising the detection part is equal to or greater than 2,800 MegaPascals (MPa).

7. The central tension line according to claim 6, satisfying Equation 1 below, $$0 \le (b - a) \le (50\% \text{ of Outer Diameter of Core Layer}),$$

wherein:

b indicates a maximum distance out of distances between a surface of the detection part and a surface of the core layer; and a indicates a minimum distance out of the distances between the surface of the detection part and the surface of the core layer.

8. The central tension line according to claim 1 wherein the protective tube is an insulating tube formed of a polymer resin having tensile strength of 60 MegaPascals (MPa) or more, elongation of 5% or more, a tensile modulus of 2,000 MPa or more, flexural strength of 90 MPa or more, a flexural modulus of 2,500 MPa or more, a melting point of 100 to 260° C., and a glass transition temperature of 80 to 82° C.

9. The central tension line according to claim 8, wherein the polymer resin is polyvinyl chloride (PVC) or polybutylene terephthalate (PBT).

10. The central tension line according to claim 1, wherein the reinforcing fibers comprise carbon fibers, wherein the carbon fibers comprise high-strength continuous fibers having a diameter of 3 to 35 μm, and have tensile strength of 3.5 to 5.0 GigaPascals (GPa), an elastic modulus of 140 to 600 GPa, and a coefficient of expansion of 0 micrometers per millidegrees Celsius (μm/m° C.) or less.

11. The central tension line according to claim 10, wherein a total volume ratio of the carbon fibers to a volume of the core layer other than the detection part is 50 to 85%, wherein the total volume ratio of the carbon fibers is defined as below:

$$\text{Total Volume Ratio (\%) of Carbon Fibers} =$$

$$\left(\text{Total Volume of CarbonFibers/Volume}\right.$$

$$\left.\text{of Core Layer other than Detection part}\right) \times 100.$$

12. The central tension line according to claim 1, wherein the thermosetting resin matrix comprises a base resin having a glass transition temperature (Tg) of 205 degrees Celsius (° C.) or higher.

13. The central tension line according to claim 12, wherein the base resin comprises an epoxy resin.

14. The central tension line according to claim 1 wherein the detection part further comprises a gap formed between the protective tube and the at least one optical fiber.

15. The central tension line according to claim 1, further comprising a cover layer configured to surround the core layer and formed of a metal material having electrical conductivity of 55 to 64% International Annealed Copper Standard (IACS).

16. The central tension line according to claim 15, wherein:

the metal material comprises an aluminum material; and a thickness of the cover layer is 0.3 to 2.5 millimeters (mm).

17. The central tension line according to claim 16, wherein a gap is formed between the core layer and the cover layer.

18. An overhead power transmission cable comprising:

the central tension line according to claim 1; and a conductor formed by uniting a plurality of aluminum alloy or aluminum wires disposed around the central tension line.

* * * * *